Dec. 29, 1936.    S. J. NORDSTROM    2,065,726
PLUG VALVE
Filed Nov. 25, 1930
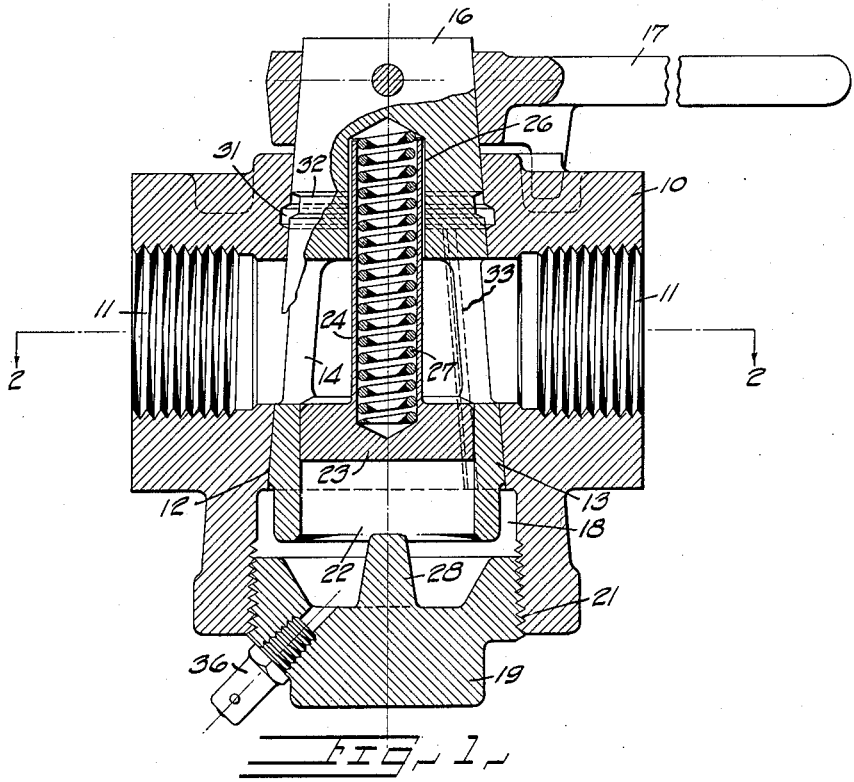
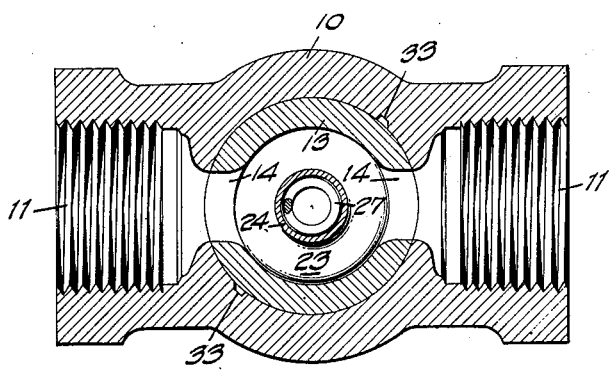
INVENTOR.
SVEN JOHAN NORDSTROM
BY
White, Prost, Flehr & Lothrop
ATTORNEYS.

Patented Dec. 29, 1936

2,065,726

UNITED STATES PATENT OFFICE 2,065,726

PLUG VALVE

Sven Johan Nordstrom, Piedmont, Calif., assignor to Merco Nordstrom Valve Company, San Francisco, Calif., a corporation of Delaware Application November 25, 1930, Serial No. 498,034

5 Claims. (Cl. 251—93)

This invention relates generally to valves of the type having a rotatable ported plug member for controlling flow of fluid thru a valve casing. More particularly it relates to plug valves of the constant pressure lubricated type having a charge of lubricant which is automatically fed to the valve working surfaces over a long period of time.

It is an object of the present invention to devise a constant pressure lubricated plug valve of simplified construction, which can be readily manufactured at a minimum of cost.

It is a further object of the invention to devise a plug valve of the above type in which certain working parts, namely the piston for applying pressure to the lubricant and the spring for normally urging the piston, form a unitary assembly with the valve plug.

Other objects of the invention will appear from the following description in which the preferred embodiment of the invention has been set forth in detail in conjunction with the accompanying drawing. It is to be understood that the appended claims are to be accorded a range of equivalents consistent with the state of the prior art.

Referring to the drawing:

Figure 1 is a side elevational view in cross section, illustrating a plug valve incorporating the present invention.

Fig. 2 is a cross sectional view taken along the line 2—2 of Fig. 1.

That embodiment of my invention illustrated in the drawing consists of a valve body or casing 10, having a passageway 11 therethrough for flow of fluid. Also formed within the casing transversely of the passageway 11, there is a bore 12, which in this particular instance is tapered. Rotatably disposed within bore 12 there is a tapered plug 13, which is provided with a transverse port 14 adapted to register with passageway 11 for open position of the valve. The small end of plug 13 is extended to the exterior of casing 10 to form a portion 16 adapted to be connected with an operating handle 17. It is evident that portion 16 is equivalent to the ordinary operating head or stem.

At the large end of the plug, which happens to be the lower end as viewed in Fig. 1, the casing is formed to provide a lubricant receiving chamber 18. One wall of this chamber is formed by a closure plug 19, which has a threaded connection 21 with the adjacent portion of the casing. Formed within the large end of the valve plug 13 and substantially concentric with the axis of rotation, there is a cylindrical bore 22. This bore preferably extends from the lower end of the plug to the lower side of the plug port 14. Therefore at its lower end it is in free communication with lubricant receiving chamber 18, while at its upper end it is in free communication with the port 14. Slidably fitted within cylinder 22 there is a piston 23.

For reasons which will be presently explained, a tube 24 is connected to piston 23, and this tube extends upwardly thru bore 14 and has its upper end slidably fitted within bore 26 formed in the small end of the plug. Housed within tube 24 there is a coiled compression spring 27. The lower end of compression spring 27 is seated upon piston 23, while the upper end of this spring is seated within the small end of plug 13 at the base of bore 26. Spring 27 therefore serves to normally urge piston 23 downwardly. Downward movement of piston 23 can be limited by the central boss 28 formed upon plug 19, and upward movement can be limited by the limit of inward movement of tube 24 into bore 26.

When the valve described above is in use, chamber 18, and also that portion of cylinder 22 below piston 23, is filled with a suitable viscous lubricating grease. This grease is maintained under considerable pressure by virtue of spring 27. By virtue of the fact that chamber 18 is in communication with the valve working surfaces, (the cooperating sealing surfaces between the plug and the valve casing) continuous application of pressure to the lubricant serves to supply lubricant under pressure to the valve working surfaces, and also serves to continuously urge the plug into its associated seat. To insure adequate distribution of lubricant to the valve working surfaces, I preferably provide a plurality of grooves which communicate with chamber 18. For example there is shown an annular groove 31 formed in the valve casing, which is in substantial registry with a corresponding annular groove 32 formed in the upper portion of the valve plug. Longitudinal grooves 33 (Fig. 2) in the valve casing have their upper ends communicating with annular groove 31 and their lower ends communicating with chamber 18.

It has been found convenient to form spring 27 so that when the piston and spring are assembled with respect to the valve plug and the plug assembled within the casing, the spring when fully expanded locates the lower face of piston 23 adjacent the lower end of plug 13. Before plug 19 is threaded into the casing, chamber 18 is packed with a suitable viscous lubricant.

As closure plug 19 is now engaged with the casing and screwed into its final position, a quantity of lubricant is displaced from chamber 18 into cylinder 22, to displace piston 23 upwardly to a position substantially as shown in Fig. 1. The valve is now ready for use and will require no new charge of lubricant over a long operating period. In the event that it is desired to introduce a fresh charge of lubricant without removing closure plug 19, this can be accomplished by introducing lubricant under pressure through a suitable lubricant fitting 36. This fitting should be provided with a suitable check valve to prevent back flow of lubricant.

It is characteristic of the valve described above that the piston 23 is substantially balanced with respect to the line pressure. This is so because the upper area of this piston is directly opposed to the line pressure thru port 14, and the line pressure is in turn transmitted to the lubricant in chamber 18. Thus the effective pressure serving to deliver the lubricant to the valve working surfaces is determined by the pressure of spring 27. Tube 24 serves not only as a protection for spring 27 but also serves as a guide for piston 23. When the valve is in use a certain amount of lubricant may leak past the piston 23. Such lubricant leakage will not interfere with operation of the piston, as it is delivered to the line thru port 14.

While the invention can be applied to a variety of types of valves for operation under various conditions, the particular valve illustrated and described in detail herein is intended primarily for low or medium pressure application, as for example in conjunction with compressed air lines.

I claim:

1. In a plug valve, a valve casing having a passageway therethrough for flow of fluid and a bore transversely of the passageway, a valve plug rotatably disposed within the bore, said plug having a port therethrough adapted to register with the passageway for open position of the valve, a cylinder formed within one end of the plug and adapted to contain lubricant, said cylinder being in communication with the valve working surfaces, a piston disposed within the cylinder, and a spring serving to normally urge the piston in a direction to deliver lubricant from the cylinder to the valve working surfaces, said spring extending thru the port in said plug.

2. In a plug valve, a valve casing having a passageway therethrough for flow of fluid and a bore transversely of the passageway, a valve plug rotatably disposed within the bore, said plug having a port therethrough adapted to register with the passageway for open position of the valve, a cylinder formed within one end of the plug and adapted to contain lubricant, said cylinder being in communication with the valve working surfaces, a piston disposed within the cylinder, and a coiled spring extending thru the port in the plug, one end of the spring being seated upon the piston and the other end being seated within the other end of the plug.

3. In a plug valve, a valve casing having a passageway therethrough for flow of fluid and a bore transversely of the passageway, a valve plug rotatably disposed within the bore, said plug having a port therethrough adapted to register with the passageway for open position of the valve, a cylinder formed within one end of the plug and adapted to contain lubricant, said cylinder being in communication with the valve working surfaces, a piston disposed within the cylinder, a tube secured to said piston and extending thru the port in the plug, and a spring disposed within said tube and serving to normally urge the piston in a direction to deliver lubricant from the cylinder to the valve working surfaces.

4. In a plug valve, a valve casing having a passageway therethrough for flow of fluid and a bore transversely of the passageway, a valve plug rotatably disposed within the bore, said plug having a port therethrough adapted to register with the passageway for open position of the valve, a cylinder formed within one end of the plug and adapted to contain lubricant, said cylinder being in communication with the valve working surfaces, a piston disposed within the cylinder, a tube extending thru the port in the plug and substantially alined with the axis of the plug, one end of said tube being secured to the piston at one side of the port and the other end of the tube being slidably guided in the plug at the other side of the port, and a coiled spring housed within said tube and serving to normally urge the piston in a direction to deliver lubricant from the cylinder to the valve working surfaces.

5. In a plug valve, a valve casing having a passageway therethrough for flow of fluid and a tapered bore formed transversely of the passageway, a tapered valve plug rotatably positioned within the bore, said plug having a port therethrough, adapted to register with the passageway for open position of the valve, a cylinder formed within the large end of the plug, a chamber formed within the casing at the large end of the plug, said chamber being in communication with the lower end of the cylinder, the upper end of the cylinder being open to one side of the port in the plug, a piston disposed within the cylinder, a tube having its one end connected to the piston and its other end slidably retained within the small end of the plug, said tube being substantially concentric with the axis of the plug, and a coiled compression spring disposed within said tube, one end of the spring being seated within the small end of the plug and the other end of the spring being seated upon the piston.

SVEN JOHAN NORDSTROM.